US 6,688,493 B2
Feb. 10, 2004

(12) United States Patent
Margalit

(10) Patent No.: US 6,688,493 B2
(45) Date of Patent: Feb. 10, 2004

(54) SYSTEM FOR FEEDING PORTIONS OF MATERIAL TO AN INJECTION MOLDING MACHINE

(76) Inventor: Eli Margalit, M.B., Moshav Yaad 20155 (IL)

(*) Notice: Subject to any disclaimer, the term of this patent is extended or adjusted under 35 U.S.C. 154(b) by 0 days.

(21) Appl. No.: 10/386,472

(22) Filed: Mar. 13, 2003

(65) Prior Publication Data

US 2003/0150873 A1 Aug. 14, 2003

Related U.S. Application Data

(63) Continuation of application No. 09/751,560, filed on Jan. 2, 2001.

(51) Int. Cl.$^7$ .............................. G01F 11/00; G01G 13/00
(52) U.S. Cl. ............................. 222/1; 222/58; 222/63; 222/77; 222/413
(58) Field of Search .................... 222/1, 58, 63, 222/77, 413, 460, 462

(56) References Cited

U.S. PATENT DOCUMENTS

| | | |
|---|---|---|
| 3,198,395 A | 8/1965 | McKinney |
| RE27,115 E | 4/1971 | Goff et al. |
| 4,722,456 A | 2/1988 | Laidlaw et al. |
| 4,762,252 A | 8/1988 | Hyer et al. |
| 5,103,401 A | 4/1992 | Johnson |
| 5,361,945 A | 11/1994 | Johanson |
| 5,387,308 A | 2/1995 | Cima |
| 5,409,137 A * | 4/1995 | Bonomelli ............. 222/56 |
| 5,423,455 A | 6/1995 | Ricciardi et al. |
| 5,713,494 A * | 2/1998 | Kaiju et al. ............. 222/199 |
| 5,988,461 A * | 11/1999 | Edney et al. ............. 222/638 |
| 6,155,709 A * | 12/2000 | O'Callaghan ............. 366/141 |
| 6,354,465 B2 | 3/2002 | Bell et al. |

FOREIGN PATENT DOCUMENTS

| | | | |
|---|---|---|---|
| DE | 19820709 | * | 5/1998 |
| EP | 0512303 | * | 11/1992 |
| EP | 5318531 | * | 12/1993 |
| EP | 8150622 | * | 6/1996 |
| WO | 0059708 | * | 10/2000 |

* cited by examiner

Primary Examiner—Joseph A. Kaufman
(74) Attorney, Agent, or Firm—Browdy and Neimark, P.L.L.C.

(57) ABSTRACT

A system for feeding portions of material to an injection molding machine including a feeding device that can be a screw feeder, an external container, a material hopper with inclined and parallel walls located inside the container, a load cell that is coupled to the material hopper and a controller. The system dispenses accurate weight portions of material in a given time and for a given duration. The system controls the portion weight by weighing a number of dispensed portions using loss-in-weight of the hopper, divides the weight to the number of portion and, when needed, controls the spin of the screw feeder motor.

30 Claims, 2 Drawing Sheets

SYSTEM FOR FEEDING PORTIONS OF MATERIAL TO AN INJECTION MOLDING MACHINE

This is a continuation of U.S. application Ser. No. 09/751,560, filed on Jan. 2, 2001.

FIELD AND BACKGROUND OF THE INVENTION

The present invention relates to a field of a molding machine and, in particular, concerned to a system for feeding portions of material to a plastic-injection molding machine.

Several weight feeding apparatus and systems are known. These apparatus and systems are for feeding a large quantity of material. When a small quantity is needed, e.g., coloring material, in a producing system, volume methods are used to achieve the needed weight. Volume methods are used for feeding small quantities because of the difficulty of weighing a few grams in the production area, which is very noisy and shaky.

Volume feeding methods, which are used to achieve weight feeding, have some disadvantages. The specific gravity of a material can be changed e.g., in a new production batch, and therefore a new scaling is needed. The volume-weight scaling is a long process and requires skilled workers. Moreover, since the fed volume cannot be controlled the volume-feeding method assumes that the feeder dispenses equal portions permanently and therefore ignores the material streaming problems.

Feeding hopper usually has an outlet to feed the material. Part of the material, the material in the shaft that is perpendicular to the outlet, does not press on the hopper. This "outlet-shaft" causes an error in the hopper weighing since the material in the outlet-shaft or at least part of this material is not weighed. Load cells are calibrated when weighing such hoppers.

There is therefore a recognized need for, and it would be highly advantageous to have, a system for feeding portions of material to an injection-molding machine with the ability to accurately weigh feeding of small quantities of material.

BRIEF SUMMARY OF THE INVENTION

The present invention is a system for feeding portions of material to an injection-molding machine with the ability to accurately weigh feeding of small quantities of material.

According to the teachings of the present invention there is provided, a system for feeding portions of material to an injection molding-machine including (a) a feeding means; (b) a container, with a fill opening and an outlet, and the container is installed with the feeding means; (c) a material hopper, with a fill opening and an outlet, and the material hopper is located inside the container; (d) a load cell that is coupled to the material hopper, and (e) a controller operative for: (i) calculating the weight of fed material, using the load cell and loss-in-weight method, and (ii) controlling the feeding means.

According to further features in the described preferred embodiments, the material hopper of the system has a funnel shaped lower part and an upper part and wherein the upper part has the same cross-section-area in each vertical level. The upper part of the material hopper can have inclined parallel-walls.

According to further features in the described preferred embodiments, the controller of the system is further operative for command the feeding means to dispense at least one portion of material from the material hopper, wherein each portion is dispensed in a given time and for a given interval of time in order to dispense portions with a predetermined weight.

According to further features in the described preferred embodiments, the controller is further operative for it calculates the weight of the dispensed portion by (1) dispensing a number of portions; (2) calculating the weight of the number of portions, using loss-in-weight method, and (3) dividing the weight of the number of portions to the number of the portions.

According to further features in the described preferred embodiments, the feeding means is a screw feeder and the controller is further operative for adjusting the weight of the further portion by increasing or decreasing the spin speed of the screw feeder, if the weight of the portion differs from the predetermined weight.

According to further features in the described preferred embodiments, the outlet of the material hopper is shifted and elevated from the outlet of the container.

According to yet another aspect of the present invention there is provided a material hopper for accurate weighing including (a) a funnel shaped lower part with outlet, and (b) a parallel or cylinder walls upper part wherein the walls can be inclined.

According to yet another aspect of the present invention there is provided a method of accurate weighing of a fed portion including (a) storing the material in a material hopper that it's upper part is an inclined cylinder or an inclined parallel walls; (b) feeding a predetermined number of portions; (c) calculating the weight of the number of portions, using loss-in-weight of the material hopper using a load cell, and (d) calculating the weight of each portion of the number of portions by dividing the weight of the number of portions to the number of the number of portions. The predetermined number of portions can be calculating by dividing the sensitivity of the load cell to the estimated weight of the fed portion.

The present invention successfully addresses the shortcomings of the existing technologies by providing a system for feeding portions of material to an injection-molding machine with the ability to accurately weigh feeding of small quantities of material.

DESCRIPTION OF THE PREFERRED EMBODIMENTS

The present invention is a system for feeding portions of material to an injection-molding machine with the ability to accurately weigh feeding of small quantities of material.

The principles and operation of the system according to the present invention may be better understood with reference to the drawings and the accompanying description.

As used herein in the specification and in the claims section that follows, the term "loss-in-weight" refers to a known method for weighing the material that has been dispensed or spent from a hopper, by weighing the hopper before taking from it having a pre-dispensing weight and secondly weighing the hopper after taking from it having an after-dispensing weight then obtaining a weight-loss of the hopper, which is the weight of the taken material, by subtracting the after-dispensing weight from the pre-dispensing-weight.

As used herein in the specification and in the claims section that follows, the term "outlet-shaft" refers to the part of the material in a hopper that is located in the shaft that extends perpendicularly to the outlet of the hopper and do not press on the hopper walls.

Figure 1:
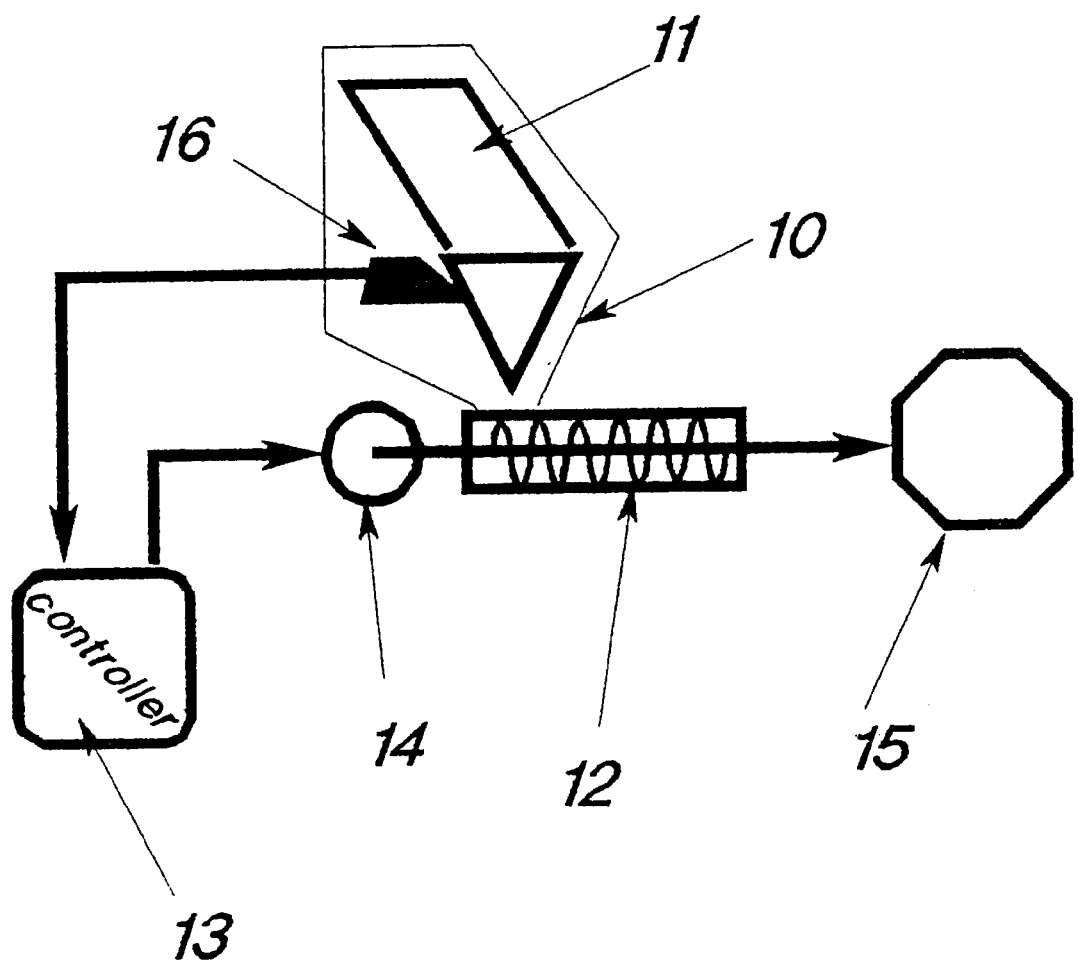
FIG. 1 is an illustration of a schematic block diagram of the system.

Referring now to the drawings, FIG. 1 illustrates a schematic block diagram of the system. The system includes a container 10, a material hopper 11 located inside the container 10, a load cell 16 coupled to the material hopper 11, a controller 13 that calculates weight according to the load cell 16 information and commands the motor 14 of the screw feeder 12 to dispense portions of material into the molding-machine 15.

The upper part of the hopper 11 has inclined walls. This shape enables to keep the material in the outlet-shaft, constant by keeping minimal level of material in the hopper. Moreover, the walls of the upper part of the hopper 11 are parallel, for this reason the shape of each new space in the hopper 11 that is created by each dispensed portion. Therefore the profile of the material-pressure, in the hopper 11, remains constant. The inclined and parallel walls of the hopper 11 minimize the weight errors and facilitate the weight calibration.

The material must be fed to the molding machine in accurate-weight portions and each portion must be fed in a given time and in a given duration. To achieve this target the controller 13 commands the motor 14 of the screw feeder 12 to start rotating in a specific spin in the given time for a given duration. Since the given time and duration of feeding are given by the molding machine 15, the screw feeder 12 spin is the only variable that can be used to control the weight of the fed portion. In the first time, the controller 13 gets a first weight of the hopper 11 from the load cell 16 and commands the motor 14 to rotate the screw feeder 12 for the given duration and a given spin that is predetermined by the system operator. After dispensing a predetermined number of portions the controller 13 gets a second weight of the hopper 11. The controller 13 obtains the total weight of the fed portions using the first weight of the hopper 11, the second weight of the hopper 11 and loss-in-weight method. The controller 13 obtains the portion weight by dividing the total weight to the number of fed portions. If the portion weight differs from a predetermined weight, the controller 13 adjusts the portion weight by increasing or decreasing the spin of the motor 14 of the screw feeder 12, in the next set of portions. This process can be done sequentially or in a predetermined time.

Figure 2:
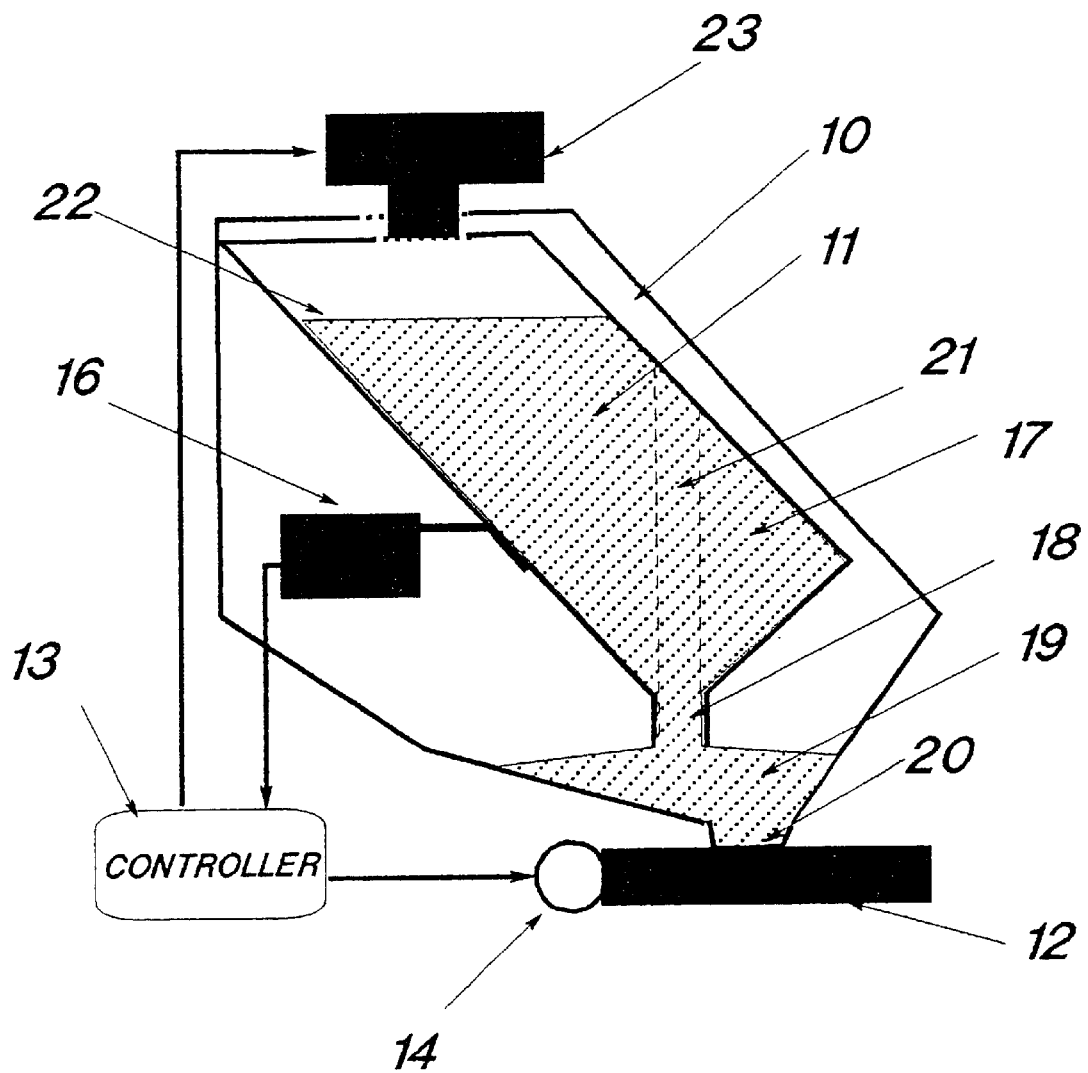
FIG. 2 is an illustration of a systems' cross-section while material is in the material hopper and the system is in a work or ready to work position.

FIG. 2 illustrates the cross-section of the system while material is in the material hopper and the system is in a work or ready to work position. The material 17 fills the material hopper 11. The material 17 is fed through an outlet 18 of the material hopper 11 to a space 19 created between outlet 18 of the material hopper and an outlet 20 of the container 10, from this space 19 the material 17 is fed through the outlet 20 of the container to the screw feeder 12. The outlet 18 of the material hopper is shifted from the outlet 20 of the container to enable keeping the outlet-shaft 21 constant as long as the material level 22 is higher than the upper end of the outlet-shaft 21 and isolates the material hopper 11 from noise and shaking which is coming from the screw feeder 12 and its motor 14. The controller 13 commands a refill means 23 to refill the material hopper 11 when the material level 22 reduced to a threshold level. Part of the material 17 is located in the space 19 and acts as a buffer. This buffer isolates the material hopper 11 and prevents noises and shakings of the screw feeder 12 and its motor 14, to enable an accurate weighing of the material hopper 11 by the load cell 16.

It will be appreciated that the above descriptions are intended only to serve as examples, and that many other embodiments are possible within the spirit and the scope of the present invention.

What is claimed is:

1. A hopper for intermediate storage of material in a system for feeding the material to a manufacturing machine, said hopper comprising:

a lower part provided with an outlet;

an upper part provided with a fill opening and an inclined wall, wherein said inclined wall has a portion that is located above said outlet, and is delimited by a vertical projection of said outlet, and the entire said fill opening is located above said inclined wall portion, and is horizontally offset from said inclined wall portion; and control means coupled to said hopper for controlling the delivery of material to said hopper to maintain said hopper filled with material to the level at or above said portion of said inclined wall, thereby causing said hopper to remain filled with material to a level at or above said inclined wall portion as material is being dispensed via said outlet.

2. The hopper of claim 1, wherein said upper part is configured to have a constant horizontal cross-sectional area.

3. The hopper of claim 2, wherein said upper part has parallel sidewalls or a cylindrical sidewall.

4. The hopper of claim 3, wherein said lower part has a funnel-shaped part.

5. The hopper of claim 1 in combination with a weighing device coupled to said hopper for weighing said hopper.

6. A system for feeding material to a manufacturing machine, comprising:

the hopper defined in claim 5;

a container for receiving the material from said hopper, said container having an outlet that is located below said outlet of said hopper; and a feeder that feeds material from the outlet of said container to the manufacturing machine.

7. The system of claim 6, further comprising a controller coupled to said feeder for controlling said feeder to dispense successive portions of material from said container, wherein each said portion is dispensed in a given time and for a given interval of time in order to dispense portions each with a predetermined weight, wherein said controller is further operative for calculating the weight of each portion by: causing a number of portions to be dispensed; calculating the total weight of said number of portions by a loss-in-weight method; and dividing the calculated total weight of said number of portions by the number of said portions, and for controlling said feeder to dispense more or less material during each given interval of time depending on whether the calculated portion weight is more or less than said predetermined portion weight.

8. The system of claim 6, wherein:

said feeder is a screw feeder that feeds material by rotating at a controlled speed; and said outlet of said container is horizontally offset from said outlet of said hopper.

9. A method for dispensing material from the hopper defined in claim 1, comprising:
 causing material to be dispensed from said hopper; and
 adding material to said hopper via said fill opening in order to constantly maintain the level of material in said hopper at or above the portion of said inclined wall that is delimited by the vertical projection of said outlet.

10. A hopper for intermediate storage of material in a system for feeding the material to a manufacturing machine, said hopper comprising:
 a lower part provided with an outlet having a periphery;
 an upper part provided with a fill opening, wherein said upper part has a wall that is located to form an upper boundary of a region enclosed by a vertical projection of said periphery and the entire said fill opening is located above, and is horizontally offset from, said upper boundary of said region such that said region is constantly filled with material as long as the level of material in said hopper is at or above said upper boundary; and
 control means coupled to said hopper for controlling the delivery of material to said hopper to maintain said hopper filled with material to the level at or above said upper boundary, thereby causing said hopper to remain filled with material to a level at or above said upper boundary as material is being dispensed via said outlet.

11. The hopper of claim 10, wherein said upper part is configured to have a constant horizontal cross-sectional area.

12. The hopper of claim 11, wherein said upper part has parallel sidewalls or a cylindrical sidewall.

13. The hopper of claim 12, wherein said lower part has a funnel-shaped part.

14. The hopper of claim 10 in combination with a weighing device coupled to said hopper for weighing said hopper.

15. A system for feeding material to a manufacturing machine, comprising:
 the hopper defined in claim 14;
 a container for receiving the material from said hopper, said container having an outlet that is located below said outlet of said hopper; and
 a feeder that feeds material from the outlet of said container to the manufacturing machine.

16. The system of claim 15, further comprising a controller coupled to said feeder for controlling said feeder to dispense successive portions of material from said container, wherein each said portion is dispensed in a given time and for a given interval of time in order to dispense portions each with a predetermined weight,
 wherein said controller is further operative for calculating the weight of each portion by: causing a number of portions to be dispensed; calculating the total weight of said number of portions by a loss-in-weight method; and dividing the calculated total weight of said number of portions by the number of said portions, and for controlling said feeder to dispense more or less material during each given interval of time depending on whether the calculated portion weight is more or less than said predetermined portion weight.

17. The system of claim 15, wherein:
 said feeder is a screw feeder that feeds material by rotating at a controlled speed; and
 said outlet of said container is horizontally offset from said outlet of said hopper.

18. A method for dispensing material from the hopper defined in claim 10, comprising:
 causing material to be dispensed from said hopper; and
 adding material to said hopper via said fill opening in order to constantly maintain the level of material in said hopper at or above the upper boundary of said region that extends across the vertical projection of said outlet.

19. A system for feeding material to a manufacturing machine, comprising:
 a container having a first outlet;
 a feeder, disposed at said first outlet, that feeds the portions of material from said container to the machine;
 a material hopper having a fill opening for receiving material that is to be fed to the machine and a second outlet located above said first outlet for delivering material to said container, said material hopper being located inside said container; and
 a weighing device disposed in said container and coupled to said material hopper for weighing said hopper.

20. The system of claim 19, wherein said second outlet is horizontally offset from said first outlet.

21. A system for feeding material to a manufacturing machine, comprising:
 a container having a first outlet;
 a material hopper having a fill opening for receiving material that is to be fed to the machine and a second outlet for delivering material to said container, said material hopper being located inside said container; and
 a weighing device disposed in said container and coupled to said material hopper for weighing said hopper.

22. The system of claim 21, wherein said material hopper has a funnel shaped lower part and an upper part and wherein said upper part has the same cross-section-area at each vertical level.

23. The system of claim 22, wherein said upper part of said material hopper has inclined parallel walls.

24. A system for feeding portions of material to a manufacturing machine comprising:
 a container having a first outlet;
 feeding means disposed at said first outlet for feeding the portions of material from said container to the machine;
 a material hopper having a fill opening for receiving material that is to be fed to the machine and a second outlet for delivering material to said container, said material hopper being located inside said container;
 a weighing device disposed in said container and coupled to said material hopper for weighing said hopper; and
 a controller coupled to said weighing device for calculating the weight of material delivered from said hopper, using said weighing device and a loss-in-weight method, and for controlling said feeding means.

25. The system of claim 24, wherein said controller is operative for commanding said feeding means to dispense successive portions of material from said material hopper, wherein each portion is dispensed in a given time and for a given interval of time in order to dispense portions each with a predetermined weight.

26. The system of claim 25, wherein said controller is further operative for calculating the average weight of each of a plurality of first portions by:
 performing a first weighing said hopper;
 after said first weighing, dispensing a plurality of first portions, the plurality of first portions being constituted by a predetermined number of first portions;

after said dispensing of a plurality of first portions, performing a second weighing said hopper;

calculating the difference between the weight of said hopper determined in said first weighing and the weight of said hopper determined in said second weighing, the difference constituting the loss of weight of said hopper; and dividing the loss of weight of said hopper by the predetermined number of said plurality of first portions.

27. The system of claim 26, wherein said feeding means is a screw feeder.

28. The system of claim 26, wherein said controller is further operative for adjusting the average weight of each of a plurality of second portions dispensed subsequent to the first portions by increasing or decreasing the feed rate of said feeding when the average weight of each of the first portions differs from said predetermined weight, and for controlling said feeding means to dispense more or less material during each given interval of time depending on whether the calculated portion weight is more or less than said predetermined portion weight.

29. The system of claim 28, wherein said second outlet is elevated above said first outlet.

30. The system of claim 28, wherein said second outlet is horizontally offset from said first outlet.

* * * * *